United States Patent

[11] 3,569,721

| [72] | Inventors | Herbert E. Goldberg<br>Concord;<br>Michael L. Polanyi, Webster, Mass. |
|---|---|---|
| [21] | Appl. No. | 790,551 |
| [22] | Filed | Jan. 13, 1969 |
| [45] | Patented | Mar. 9, 1971 |
| [73] | Assignee | American Optical Corporation<br>Southbridge, Mass. |

[54] MEASURING BILIRUBIN IN BLOOD USING LIGHT AT TWO WAVELENGTHS
10 Claims, 1 Drawing Fig.

[52] U.S. Cl. ................................................. 250/218,
250/226, 356/81
[51] Int. Cl. ............................................... G01n 2/26
[50] Field of Search .................................... 250/218,
226; 356/39—42, 81, 82, 89, 179, 184—186

[56] References Cited
UNITED STATES PATENTS

| 2,070,223 | 3/1937 | Rose .............................. | 356/40 |
| 3,081,399 | 3/1963 | Schwarz ......................... | 250/220 |
| 3,383,515 | 5/1968 | Cobb et al. .................... | 250/218 |

*Primary Examiner* — James W. Lawrence
*Assistant Examiner* — Martin Abramson
*Attorneys* — William C. Nealon, Noble S. Williams and Robert J. Bird

ABSTRACT: Measuring the concentration of bilirubin in unmodified blood serum by defining the light transmission of a microsample of the serum in terms of bilirubin concentration at two preselected specific wavelengths of light wherein the effect of hemoglobin on transmission through the sample is eliminated.

PATENTED MAR 9 1971
3,569,721
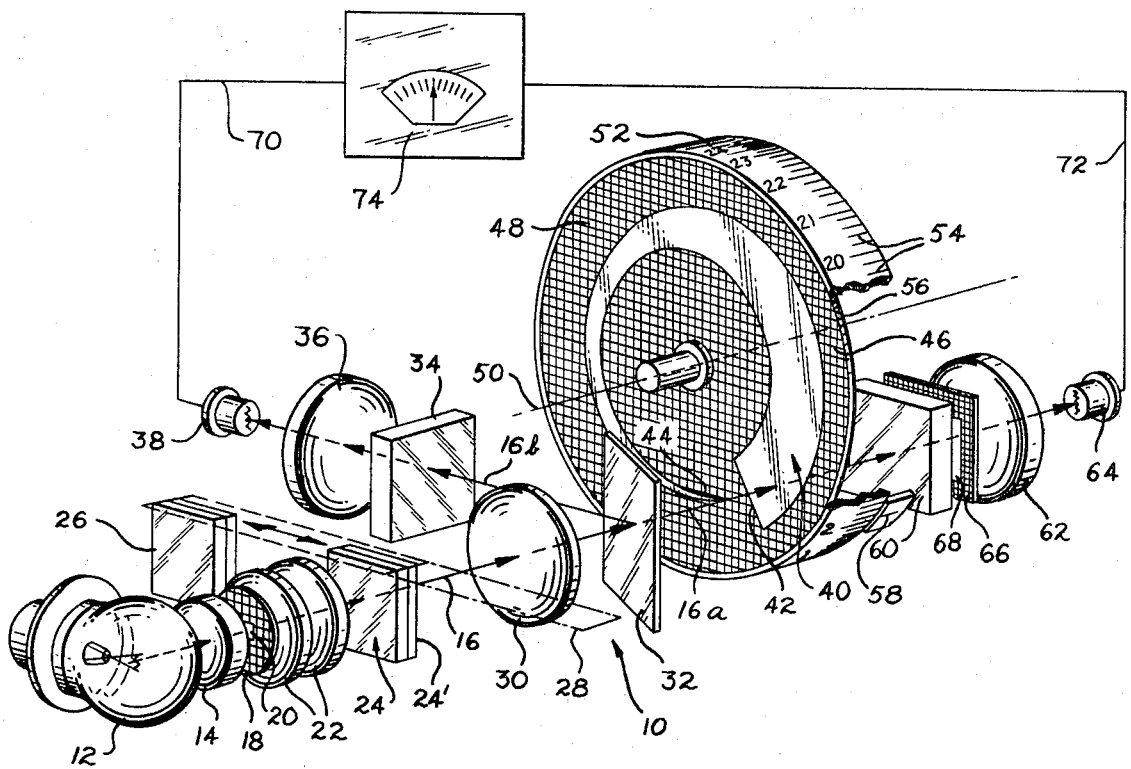
INVENTOR.
HERBERT E. GOLDBERG
MICHAEL L. POLANYI
BY
Noble D. Williams
ATTORNEY

MEASURING BILIRUBIN IN BLOOD USING LIGHT AT TWO WAVELENGTHS

BACKGROUND OF THE INVENTION

1. Field of the Invention

Analyzing samples of blood serum with particular reference to a method and apparatus for measuring the concentration of total serum bilirubin in samples of unmodified blood plasma independently of hemoglobin.

2. Description of The Prior Art

Bilirubin produces a yellow staining in blood serum which varies in density with liver function and accordingly provides an indication of the health of the host.

In the case of babies, particularly those born prematurely, contamination of bilirubin must be detected and defined as quickly and accurately as possible. Heretofore, however, accurate and reliable determinations of bilirubin concentration in blood serum have involved long and tedious processes requiring a great deal of chemical manipulation wherein lengthy sample dilution reactions were used to convert bilirubin in blood samples to azide-bilirubin. The considerable length of time required for so chemically processing and testing sera samples can be detrimental to the patient particularly in the case of new born infants where time is often a critical factor in the treatment of body malfunctions.

It is, accordingly, an object of this invention to provide for rapid, accurately defined and reliable determinations of bilirubin contamination in blood serum samples and further to eliminate the effects of hemoglobin and light scattering in the sample as factors in the final determination of bilirubin concentration.

In classical spectrophotomeric methods of measuring bilirubin, compensation for the effects of hemoglobin in test sera requires the performance of complex computations which are obviated by the present inventive concept.

The present bilirubin measuring system defines the light transmission of a microsample of natural blood serum at two specific wavelengths of light which are so preselected that the effect of hemoglobin on the reading of bilirubin concentration is automatically eliminated. Furthermore, the test is nondestructive wherein the sample may be recovered and used for other tests.

SUMMARY OF THE INVENTION

According to principles of the present inventive concept, the concentration of blood serum bilirubin is measured directly, e.g., in milligrams per 100 milliliter, with automatic compensation for light scattering and hemoglobin in the sample. This is accomplished by transmitting light through a microsample of unmodified blood plasma to a beam splitter which divides the light into two discrete optical paths and thence through a band-pass filter, one in each of said paths of light, into incidence upon a pair of photodetectors also one in each path of light.

One of the filters is so preselected as to transmit substantially only light centered at an absorption peak for bilirubin in serum and the other filter is so preselected as to transmit substantially only light of a preselected wavelength upon which the effect of hemoglobin in its transmittance through the sample is the same as that imposed upon the first-mentioned wavelength of light.

Prior to the testing of a blood sample, a reference standard is positioned in the system with respect to which the output of the photodetectors may be balanced for establishing a particular ratio of photodetector responses to light subsequently directed through a serum sample.

When the reference standard is replaced by the serum sample, a light wedge disposed in the path of the second-mentioned filter is adjusted to a point where the amount of light passing through the second filter and becoming incident upon its adjacent photodetector is of an intensity equal to that of the light transmitted through the first-mentioned filter to its adjacent photodetector. A scale calibrated to read in terms of milligrams per 100 milliliter bilirubin, according to the extent of adjustment of the light wedge, provides a direct reading of bilirubin concentration in the sample under test.

The reading, however, does include a measurement of all yellow colorants in the serum sample which, in addition to bilirubin, may for example include carotene and/or other yellow compounds. These compounds are medically accepted as insignificant in new born infants and hence, any errors resulting from other than bilirubin colorants may be neglected.

In tests performed with adult blood serum the measurement may be considered more as being one of jaundice (i.e., yellowishness). However, with an understanding of the nature of the measurement produced by the present system which includes a measurement of all yellow colorants in the sample it has been determined that one may subtract one-half milligram from the reading to obtain a more direct reading of adult bilirubin concentration.

In all cases, turbidity of the sample, light scattering and hemoglobin are compensated for in such manner that these factors do not affect the accuracy of the final determination of bilirubin concentration or jaundice, whichever the case may be.

DESCRIPTION OF THE DRAWING

The FIGURE is a schematic illustration of one embodiment of the invention.

DESCRIPTION OF THE PREFERRED EMBODIMENTS

The FIGURE schematically illustrates a system for measuring bilirubin concentration in blood serum according to principles of the present invention.

The system indicated generally by reference numeral 10 comprises a light source 12 (e.g., a conventional tungsten filament lamp) which, when energized, emits light of wavelengths extending throughout a wide range of the electromagnetic spectrum including light wavelengths within the range of from 461 m$\mu$ to 551 m$\mu$ and considerably beyond these figures in either direction.

Light emitted from source 12 is received by diffusing element 14 which may embody a piece of ground or opal glass. As it will become more readily apparent hereinafter, element 14 serves to diffuse light which is directed along primary optical path 16 of system 10 so as to prevent an imaging of the filament of light source 12 upon photodetectors in the system. This provides for substantially uniform illumination of light receiving surfaces of the photodetectors.

Immediately adjacent to diffusing element 14 is apertured opaque plate 18 which prevents extreme rays of the diffused light from straying through the optical projection-measuring portion of system 10, a description of which follows. Aperture 20 of plate 18 is of a size preselected to provide the projection-measuring portion of system 10 with a sufficient amount of light to effect efficient operation of the system.

The projection-measuring portion of system 10 comprises condenser lenses 22 which receive light from aperture 20 and condense this light upon a sample holder 24 or reference standard 26, whichever is placed forwardly of lenses 22 in system 10.

Sample holder 24 and standard 26 are located at testing station 28 which is depicted by dot-dash outline as being a guide member along which the holder and standard may be moved one into and the other out of axial alignment with path 16, as desired, during performance of the testing operation to be subsequently described in detail. Guide 28 is to be taken only as being illustrative of one of various arrangements which may be incorporated in system 10 for locating either the reference standard or sample holder in the aforesaid aligned relationship with path 16.

In the presently illustrated embodiment of system 10, sample holder 24 comprises a plate of clear glass having a recessed sample receiving chamber in one side thereof and a cover 24'.

The sample is supported in the chamber for testing purposes by capillary action. The chamber in holder 24 is, preferably, in the order of 0.3 millimeters in depth and covers an area of the holder which, when the holder is axially aligned relationship with path 16, extends well beyond the width of the path of light rays projected therethrough. Also, in the presently illustrated embodiment of this invention, reference standard 26 is comprised of a pair of glass plates between which there is laminated one or more thin films which are designed to closely approximate the absorption characteristics of bilirubin, i.e., simulate bilirubin of a very low concentration.

Collimating lens 30 receives light rays transmitted through either the sample holder 24 or standard 26 and directs these rays to beam splitter 32. Beam splitter 32 divides the light into two branches of equal intensity one of which is directed along each of optical paths 16a and 16b. For purposes of illustration, beam splitter 32 is shown herein as being of the half-silvered mirror type disposed at an angle of 45° relative to the axis of path 16 whereby one-half of light directed thereupon is reflected right angularly in the direction indicated by the arrows of path 16b while the other half of said light is transmitted straight through the material of the beam splitter in the direction of the arrows of path 16a.

In path 16b there is positioned band-pass filter 34 which, in this embodiment of the invention, is characterized as being transmissive only to light having a wavelength of approximately 461 m$\mu$. Following filter 34 in path 16b is condenser lens 36 which directs this light upon photodetector 38.

Immediately following beam splitter 32 in optical path 16a there is positioned a light-conducting wedge 40 which is so constructed and arranged as to be, in effect, an adjustable aperture stop regulatory of the amount of light passing therethrough. In this respect, optical wedge 40 is generally annular and is progressively circumferentially decreased in its width dimension from a maximum at one end to zero at its opposite end. Wedge 40 is formed upon a glass disc 46 by an opaque coating 48 which is applied to at least one side of the disc in such a manner as to leave a clear area on the disc having the aforesaid annular wedge-shaped configuration. Disc 46, being disposed in perpendicular relationship to optical path 16a as illustrated, is rotatable about its axis 50 which extends parallel to path 16a at a distance to one side thereof equal to the mean radial dimension of the wedge. Scale 52 having indicia 54 extends circumferentially about edge 56 of disc 46 to which it is fixedly attached. Indicia 54 are calibrated to read bilirubin concentration (e.g., in milligrams/100 milliliters) when referenced with a fixed index 58.

Following wedge 40 in optical path 16a is band-pass filter 60 which is so characterized as to transmit substantially only light wavelengths of 551 $\mu$ through condenser lens 62 into incidence upon photodetector 64. Between filter 60 and lens 62 is opaque plate 66 having aperture 68 which limits the light reaching lens 62 and photodetector 64 to an amount not appreciably greater than that required for efficient operation of the photodetector.

Electrical connections represented by single lines 70 and 72 connect photodetectors 38 and 64 respectively in circuit with a conventional galvanometer 74 by means of which differences in electrical responses of the photodetectors may be envisioned.

In operation, the instrument of system 10 measures the optical densities at two wavelengths (461 $\mu$ and 551 $\mu$) of light which is projected through a test sample placed in holder 24. The absorption peak for bilirubin in blood serum being at 461 $\mu$ and the absorbance of light as affected by hemoglobin being the same for both 461 and 551 $\mu$ wavelengths results in the amount of light reaching photodetector 38 being reduced with respect to the light received by photodetector 64 by an amount in accordance with the concentration of bilirubin in the sample of blood serum under test. Thus, a measurement of the differences in intensity of light received by photodetectors 38 and 64 provides a measurement of bilirubin concentration. This measurement is performed as follows:

System 10 is calibrated for the testing operation by positioning reference standard 26 in optical path 16 (i.e., in the position now illustrated as being occupied by sample holder 24). With light source 12 energized, and scale 52 set to read the known value of standard 26 in terms of bilirubin concentration galvanometer 74 is set to read zero. This, accordingly, sets a particular ratio of photodetector responses to light passing through the two filters 34 and 38.

The serum sample is then positioned in optical path 16 as illustrated in FIG. 1 (i.e., by sample holder 24) whereby light reaching photodetector 34 is reduced in intensity by an amount according to the concentration of bilirubin in the sample under test. This, of course, will be indicated by a deflection of the galvanometer needle which is again brought to a null or zero reading. This time, however, the zero reading is brought about by rotation of optical wedge 40 which attenuates the amount of light incident upon photodetector 38. When such adjustment of optical wedge 40 reaches the point where galvanometer 74 once again reads zero, the ratio of photodetector responses is again the same as when the instrument was initially balanced according to the reference standard. Scale 52, when read against index 58 after wedge 40 is adjusted (i.e., rotated clockwise from the position now shown in FIG. 1) provides the measure of bilirubin concentration in the blood sample under test.

Equally spaced indecia on scale 52 for reading bilirubin in terms of concentration (mg./100 ml.) may be achieved by designing the intensity control aperture (transparent wedge 40) of system 10 so that the negative logarithm of the area of this aperture is proportional to the bilirubin concentration, i.e., the negative logarithm of the area of wedge 40 which limits the 551 $\mu$ light incident upon photodetector 38 is linear with the scale. Thus the difference in bilirubin concentration on the scale of the instrument is a difference in the logarithm of light transmitted through the optical wedge when the ratio of light intensity in optical paths 16a and 16b is set by the wedge with the sample in the system.

If the intensity of the light of short wavelength (461 $\mu$) passing through the sample is designated as I (sw) and the intensity of the light of long wavelength passing through the sample is designated as I (lw) then:

$$\frac{I\ (sw)}{I\ (lw)\ AA} \text{ of the standard} = \frac{I\ (sw)}{I\ (lw)\ AA}$$

of the sample where AA is the area of the aperture.

There are many factors which decrease the intensity of light transmitted by the sample but, if these factors have the same effect on both the short and long wavelengths of light, their ratio is unity and such factors, accordingly, have no effect upon the instrument reading. It is for this reason that scattered light and hemoglobin concentration in the sample do not affect the reading.

For serum samples from infants it has been found that yellow colorants other than bilirubin are either in very small quantities so as to not affect the transmission appreciably or are equal in the two wavelength regions except for the bilirubin concentration so that the changes in ratio I (sw) to I (lw) are by bilirubin alone.

In the case where samples of adult blood serum are used, yellow colorants other than bilirubin in the serum may be somewhat more significant whereby one might prefer to designate the reading produced by system 10 on scale 52 as being one of jaundice i.e., yellowishness) of the serum sample rather than total bilirubin alone. However, in such cases, it has been found that an accurate designation of bilirubin alone may be obtained by subtracting one-half mg./100 ml. from the reading of scale 52. Alternatively, the scale may be so calibrated as to read directly in terms of bilirubin for adult serum in instances where system 10 is intended for this use only or in instances where such would be its primary use. It should be understood, however, that with system 10 calibrated for adult serum the addition of one-half mg./100 ml. to its reading of bilirubin concentration will provide an accurate measurement of bilirubin concentration in infant blood serum.

System 10 may be modified either by placing wedge 40, scale 52 and index 58 between beam splitter 32 and filter 34 or by interchanging filters 34 and 60. In such cases, adjustment of wedge 40 would be in a direction to increase its aperture size with an increase in sample bilirubin concentration with scale 52 calibrated accordingly.

We claim:

1. A method of measuring the concentration of bilirubin in blood serum comprising the steps of:
    directing light rays through a sample of said serum and forming said light rays into a beam of light directed along an established principal optical path;
    dividing said light rays of said beam into two substantially equal amounts at one point in said principal optical path and directing each of said equal amounts of light rays along a different discrete branch path wherein the total amount of light in each branch path is equal;
    filtering at one point in one of said branch paths substantially all wavelengths of the light therein but that for which bilirubin in serum has a maximum absorbance;
    filtering at one point in the other of said branch paths substantially all wavelengths of the light therein but that for which hemoglobin in blood serum has substantially the same absorbance as it has for the light of said first-mentioned wavelength, said first and last-mentioned wavelengths of light being of different frequencies; and
    adjusting the amount of light of one of said frequencies to equality with the amount of light of different frequency by operation of adjustable aperture stop means disposed in one of said branch paths whereby the extent of adjustment of said stop means may be interpreted in terms of the concentration of bilirubin in said sample.

2. The method according to claim 1 wherein said first and last-mentioned wavelengths of light are 461 $\mu$ and 551 $\mu$ respectively.

3. The method according to claim 2 wherein said light of different frequencies is adjusted by attenuation of the light of 551 $\mu$ wavelength.

4. The method according to claim 2 wherein said light of different frequencies is adjusted by increasing the amount of said light of 461 $\mu$ wavelength with respect to the amount of said light of 551 $\mu$ wavelength.

5. A system for measuring the concentration of bilirubin in a sample of blood serum comprising:
    a source of light;
    a sample holder positioned to receive light rays emitted by said source wherewith a blood sample placed in said holder is transilluminated;
    projection lens means arranged to receive at least a substantial amount of said light rays transmitted through said holder and sample for forming and projecting a beam thereof along a principal optical path in said system;
    a beam splitter in said principal path constructed and arranged to divide said light rays of said beam into two parts of substantially equal amounts and direct each part discretely along an individual branch path;
    a band-pass filter in each branch path through which substantially only light rays of one wavelength are permitted to pass;
    an electrical photodetector so positioned in each branch path as to receive only respective light rays of the one wavelength;
    projection lens means between said photodetector and band-pass filter in each branch path for receiving and directing said light rays into incidence upon respective photodetectors in said paths;
    an adjustable light attenuator in one of said branch paths for regulating the amount of light rays received by the particular photodetector in said one path;
    a meter for indicating relative electrical responses of said photodetectors to light rays received thereby; and
    a scale moveable in conjunction with adjustment of said attenuator, said scale being calibrated to read bilirubin concentration in terms of the amount of regulation of light effected by operation of said attenuator for a given indication of relative responses of said photodetectors on said meter.

6. The system according to claim 5 wherein one of said band-pass filters is transmissive substantially only to light rays having a wavelength of 461 $\mu$ and the other band-pass filter is transmissive substantially only to light rays having a wavelength of 551 $\mu$.

7. The system according to claim 5 wherein said light attenuator is opaque with an elongated light-transmitting portion of progressively diminishing width.

8. The system according to claim 7 wherein said light-transmitting portion of said attenuator is annular.

9. The system according to claim 7 wherein the calibration of said scale is linear with the negative logarithm of the area of said light-transmitting portion of said light attenuator and said negative logarithm of said area is proportional to bilirubin concentration in blood serum.

10. The system according to claim 9 further including a reference standard having light-absorption characteristics similar to blood serum of low bilirubin concentration, means for temporarily substituting said standard for said specimen holder whereby a given ratio of responses of said photodetectors to said rays of 461 $\mu$ and 551 $\mu$ wavelengths may be established prior to operation of said system with said specimen holder in place.